US006457404B1

(12) United States Patent
Munesada et al.

(10) Patent No.: US 6,457,404 B1
(45) Date of Patent: Oct. 1, 2002

(54) POLISHED CEREAL PROCESSING APPARATUS

(75) Inventors: Takeshi Munesada; Yukihiro Kawano; Hidefumi Fujikawa; Syuji Uda, all of Tokyo (JP)

(73) Assignee: Satake Corporation, Tokyo ( * ) Notice: Subject to any disclaimer, the term of this patent is extended or adjusted under 35 U.S.C. 154(b) by 0 days.

(21) Appl. No.: 10/057,868

(22) Filed: Jan. 29, 2002

(30) Foreign Application Priority Data

Feb. 8, 2001 (JP) ....................................... 2001-032953

(51) Int. Cl.[7] ............................ A23L 1/00; A23L 1/10; B02B 3/02; B02B 3/00; A23N 5/00

(52) U.S. Cl. ............................ 99/519; 99/483; 99/486; 99/600; 99/606; 99/609; 99/615; 99/617; 241/7; 241/14; 241/74

(58) Field of Search .................. 99/348, 483, 485–489, 99/516, 518–531, 600–606, 609–617, 618–622; 241/7, 9, 11, 14, 10, 76, 81, 74, 159, 162; 426/481–483

(56) References Cited

U.S. PATENT DOCUMENTS 3,747,511 A * 7/1973 Palyi ........................... 99/516
3,766,847 A * 10/1973 Palyi ........................... 99/484
4,126,707 A * 11/1978 Hart .......................... 241/7 X
4,329,371 A * 5/1982 Hart ....................... 426/481 X
4,522,837 A 6/1985 Meinardus
4,658,712 A * 4/1987 Spencer ..................... 99/622 X
4,949,632 A * 8/1990 Porzi ......................... 99/483 X
4,978,078 A * 12/1990 Vadnay ...................... 99/605 X
5,020,732 A * 6/1991 Bahrani ..................... 241/14 X
5,232,697 A * 8/1993 Bahrani ..................... 99/600 X
5,379,949 A * 1/1995 Massen et al. ............ 241/11 X
5,394,792 A * 3/1995 Satake et al. ................. 99/519
5,476,036 A * 12/1995 Liebing ..................... 99/524 X
5,542,616 A * 8/1996 Archer ...................... 241/76 X
2001/0033885 A1 10/2001 Satake et al.

FOREIGN PATENT DOCUMENTS

JP 10-066884 3/1998

OTHER PUBLICATIONS

Japanese Abstract, Publication No. 1137191, dated May 25, 1999.

Japanese Abstract, Publication No. 01027651, dated Jan. 30, 1989.

Japanese Abstract, Publication No. 11113509, dated Apr. 27, 1999.

Japanese Abstract, Publication No. 08281128, dated Oct. 29, 1996.

* cited by examiner

*Primary Examiner*—Timothy F. Simone
(74) *Attorney, Agent, or Firm*—Staas & Hasley LLP

(57) ABSTRACT

An apparatus for processing polished cereal to obtain no-bran cereal having a reduced size. The apparatus comprises a polished cereal processing section for removing bran remaining on surfaces of polished cereal by mixing granular material with the polished cereal so that the remaining bran is captured by the granular material, and separating the polished cereal with bran removed and the granular material with bran captured; and a granular material reprocessing section for reprocessing the granular material with bran captured and feeding back the reprocessed granular material to the polished cereal processing section for recycling the granular material. The granular material reprocessing section includes a screen tube for separating the granular material within a predetermined granularity range and a removing roller arranged to rotate in the screen tube for removing the bran captured on surfaces of the granular material fed into the screen tube.

11 Claims, 7 Drawing Sheets

POLISHED CEREAL PROCESSING APPARATUS

BACKGROUND OF THE INVENTION

1. Field of the Invention

The present invention relates to an apparatus for processing polished cereal such as polished rice to obtain no-bran cereal such as no-bran rice which requires no washing before cooking.

2. Description of Related Art

Processed polished rice, i.e., no-bran rice which requires no wash before cooking is going to be brought into the market. The no-bran rice is obtained by removing bran including an aleurone layer which remains in grooves or concaves on grain surfaces of polished rice after subjected to polishing by a polishing machine. As a method of manufacturing the no-bran rice, there are known a method in which the polished rice as material is subjected to polishing in water for a minute time and then dehydrated to be dried, a method in which the polished rice is polished by a grinding brush to remove the remaining bran, and a "granular material mixing/stirring" method in which granular material as adhesive agent such as amyloid and grinded grain is mixed and stirred with the polished rice so that the granular material captures the remaining bran.

FIG. 8 shows a polished rice processing apparatus 100 having a polished rice processing section 200 according to the "granular material mixing/stirring" method, as proposed in U.S. Patent Application No. 09/812,778. The polished rice processing section 200 includes a wet processing device 400 for softening the bran remaining on the surfaces of the material polished rice by stirring the material polished rice while adding moisture thereto, a thermal-adhesion material processing device 500 for adding pre-heated granular material to the polished rice so that the granular material captures the softened remaining bran, and a separating/drying device 600 for separating the processed polished rice from the granular material to obtain no-bran rice. The granular material separated by the separating/drying device 600 is collected and reprocessed by a granular material reprocessing section 300 for recycling and fed back to the thermal-adhesion material processing device 500.

The granular material having predetermined granularity smaller than granularity of the material polished rice is used in the polished rice processing apparatus of the granular material mixing/stirring type so as to enable the separation of the processed polished rice from the granular material on the basis of the granularity by the separating/drying section 600 and also to effectively capture the bran remaining on the material polished rice. If the granular material separated by the separating/drying device 600 is directly fed back to the thermal-adhesion material processing device 500, size of the granular material gradually increases by the bran captured on the surface of the granular material, to make the separation of the processed polished rice and the granular material by the separating/drying section 600 incomplete to rise a problem of immixture of the granular material in the processed polished rice.

Therefore, so as to recycle the granular material, it has been required to provide the granular material recycling section 300 as follows. The granular material recycling section 300 comprises a sifting device 700 for shifting the granular material separated by the separating/drying device 600 into a plurality of granularities, an abrading device 800 for abrading the bran from the surfaces of the granular material by passing a pair of rollers rotating in opposite directions, a drying device 900 for heating and drying the granular material with the bran removed from the surfaces of the granular material by the abrading device 800 and the sifting device 700, and a conveying device 910 for feeding back the processed granular material to the thermal-adhesion material processing device 500. The granular material after processed by the granular material recycling section 300 having regulated granularity is securely separated from the processed polished rice by the separating/drying device 600 of the polished rice processing section 200.

However, since the granular material recycling section 300 comprises the sifting device 700, the abrading device 800, the drying device 900 and the conveying device 910 to be separately installed, the size of the polished rice processing apparatus 100 has to be large.

SUMMARY OF THE INVENTION

An object of the present invention is to reduce a size of the granular material regeneration section to thereby make a whole size of the polished rice processing apparatus small.

The polished cereal processing apparatus of the present invention comprises: a polished cereal processing section for removing bran remaining on surfaces of polished cereal by mixing granular material with the polished cereal so that the remaining bran is captured by the granular material, and separating the polished cereal with bran removed and the granular material with bran captured; and a granular material reprocessing section for reprocessing the granular material with bran captured and feeding back the reprocessed granular material to the polished cereal processing section for recycling the granular material. The granular material reprocessing section includes a screen tube for separating the granular material within a predetermined granularity range and a removing roller arranged to rotate in the screen tube for removing the bran captured on surfaces of the granular material fed into the screen tube.

With the above arrangement, the bran captured on surfaces of the granular material is effectively removed by the rotation of the removing roller and the granular material with bran removed to have granularity within a predetermined range is separated by the screen tube and fed back to the polished cereal processing section for recycling the granular material. Since it is unnecessary to provide the abrading device and the sifting device in the prior art in the granular material reprocessing section, the granular material reprocessing section is made small.

The cereal may be rice, wheat, barley corn, etc. As the granular material, edible granular material obtained by processing starch, such as cassava, to be pre-gelatinized and dried to form into small balls having predetermined uniform granularity such as pearl tapioca, and also grinded cereal such as grinded rice can be preferably used.

The polished cereal processing section may comprise: a wet processing device for stirring the polished cereal while adding moisture thereto so as to soften the bran remaining on surfaces of the polished cereal; a thermal-adhesion material processing device for mixing and stirring the polished cereal processed by said wet processing device with preheated granular material so as to remove the softened bran on the surfaces of the polished cereal to be captured by the granular material; and a separating/drying device for drying the surfaces of the polished cereal processed by said thermal-adhesion material processing device and separating the polished cereal from the granular material. In the case of adopting the polished cereal processing section of above arrangement, the granular material reprocessed by the granular material reprocessing section is fed back to the thermal-adhesion material processing device.

By adopting the above arrangement of the polished cereal processing section, the softened bran remaining on the surfaces of the polished cereal is gelatinized immediately after touching with the preheated granular material (thermal-adhesion material) mixed and stirred with the polished cereal in the thermal-adhesion material processing device and is adhered to be captured by the granular material and removed from the surface of the polished rice with the aid of transfer of the moisture of the bran to the granular material. Then, the polished cereal with the bran removed and the granular material with bran removed are dried and separated by the separating/drying device.

The granular material reprocessing section may comprise: a granular material regulating device for regulating the granularity of the granular material by removing the bran captured on the surfaces of the granular material; a drying device for drying the granular material regulated by the granular material regulating device, and a conveying device for conveying the regulated granular material to the polished cereal processing section.

The bran captured on the surfaces of the granular material is removed by the removing roller and the removed bran and the granular material with bran removed are screened by the screen tube in the granular material regulating device. The screened granular material is dried by the drying device and conveyed to the polished cereal processing section. The granular material conveyed to the polished cereal processing section is suitable for reuse since it has regulated granularity and has heated by hot air supplied in the drying device.

The granular material regulating device may comprise: an inlet for supplying the granular material into the screen tube; an outlet for discharging granular material which has not passes through meshes of the screen tube; and a rotary shaft arranged in the screen tube for supporting the removing roller at an upstream side near the inlet and a discharge screw for feeding granular material remaining in said screen tube towards said outlet at a downstream side near the outlet. The meshes of the screen tube have a first mesh size to prevent the granular material of a predetermined granularity from passing through in a first region around the removing roller and a second mesh size to allow the granular material of the predetermined granularity to pass through in a second region around the discharge screw.

The bran removed from the granular material by the rotation of the removing roller passes through the meshes in the first region having a first mesh size to be separated, and the granular material with bran removed to have the granularity within the predetermined range passed through the meshes in the second region having the second mesh size to be separated.

The granular material regulating device may further comprise a feed screw fixed on the rotary shaft in the vicinity of the inlet to feed the granular material into the screen tube. In this case, the first region of meshes of said screen tube may extend to cover at least a part of the feed screw, so as to discharge fine grinded particles, etc. mixed in the granular material through meshes of the screen tube before the granular material reaches the removing roller.

The granular material discharged from the outlet may be fed back to the inlet so that the granular material with bran insufficiently removed is subjected to the removing action of the removing roller again to improve yield of reprocessing of the granular material.

The removing roller may comprise a stirring roll having protrusions on an outer circumference thereof for stirring the granular material in the screen tube. In this case, it is preferable that the screen tube has a polygonal cross section to improve effectiveness of removal action of the bran by the stirring roll.

Alternatively, the removing roller may comprise an abrading roll for abrading the granular material in the screen tube. In this case, it is preferable that the screen tube has a circular cross section.

The drying device may comprise a hot air generator and a blowing fan for supplying hot air blow, and the conveying device may comprise a conveying pipe communicating with the drying device and the polished cereal processing section for conveying the granular material regulated by the granular material regulating device to the polished cereal processing section by the hot air blow supplied from the drying device. With this stricture, the regulated granular material is dried and heated by the hot air blow supplied from blowing fan while being conveyed in the conveying pipe by the hot air blow.

DETAILED DESCRIPTION OF THE PREFERRED EMBODIMENTS

Preferred embodiments of an apparatus for processing polished cereal according to the present invention will be described with respect to rice as an example of cereal, referring to FIGS. 1–7.

Figure 1:
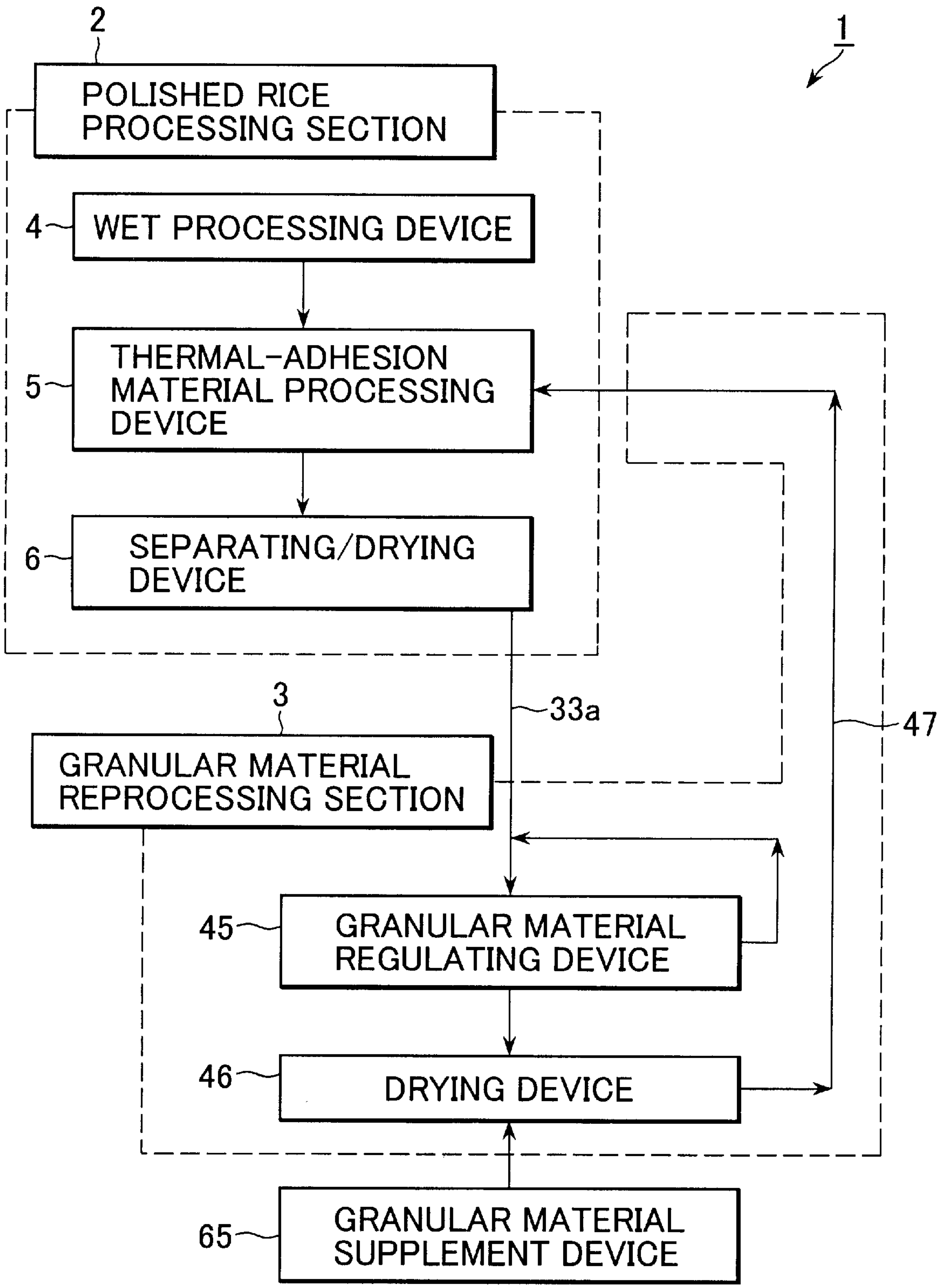
FIG. 1 is a schematic block diagram showing an arrangement of the polished rice processing apparatus according to the present invention.

As shown in FIG. 1, a polished rice processing apparatus 1 comprises a polished rice processing section 2 for processing material polished rice using granular material to produce no-bran rice, and a granular material reprocessing section 3 for reprocessing the granular material separated from the processed polished rice and feeding back the reprocessed granular material to the polished rice processing section 2.

The polished rice processing section 2 comprises a wet processing device 4 for stirring the material polished rice while adding moisture thereto so as to soften bran remaining on surfaces of the material polished rice, a thermal-adhesion material processing device 5 for adding preheated granular material as thermal-adhesion material to the moistened polished rice and mixing and stirring the polished rice with the granular material so that the granular material captures the softened bran on the surfaces of the polished rice, and a separating/drying device 6 for drying the processed polished rice and separating the processed polished rice from the granular material on the basis of granularity thereof.

The granular material reprocessing section 3 comprises a granular material regulating device 45 for regulating the granularity of the granular material by removing the bran captured on the surface of the granular material, a drying device 46 for drying the granular material with bran removed, and a conveying device 47 for conveying the reprocessed granular material to the thermal-adhesion material processing device 5 of the polished rice processing section 2.

Figure 2:
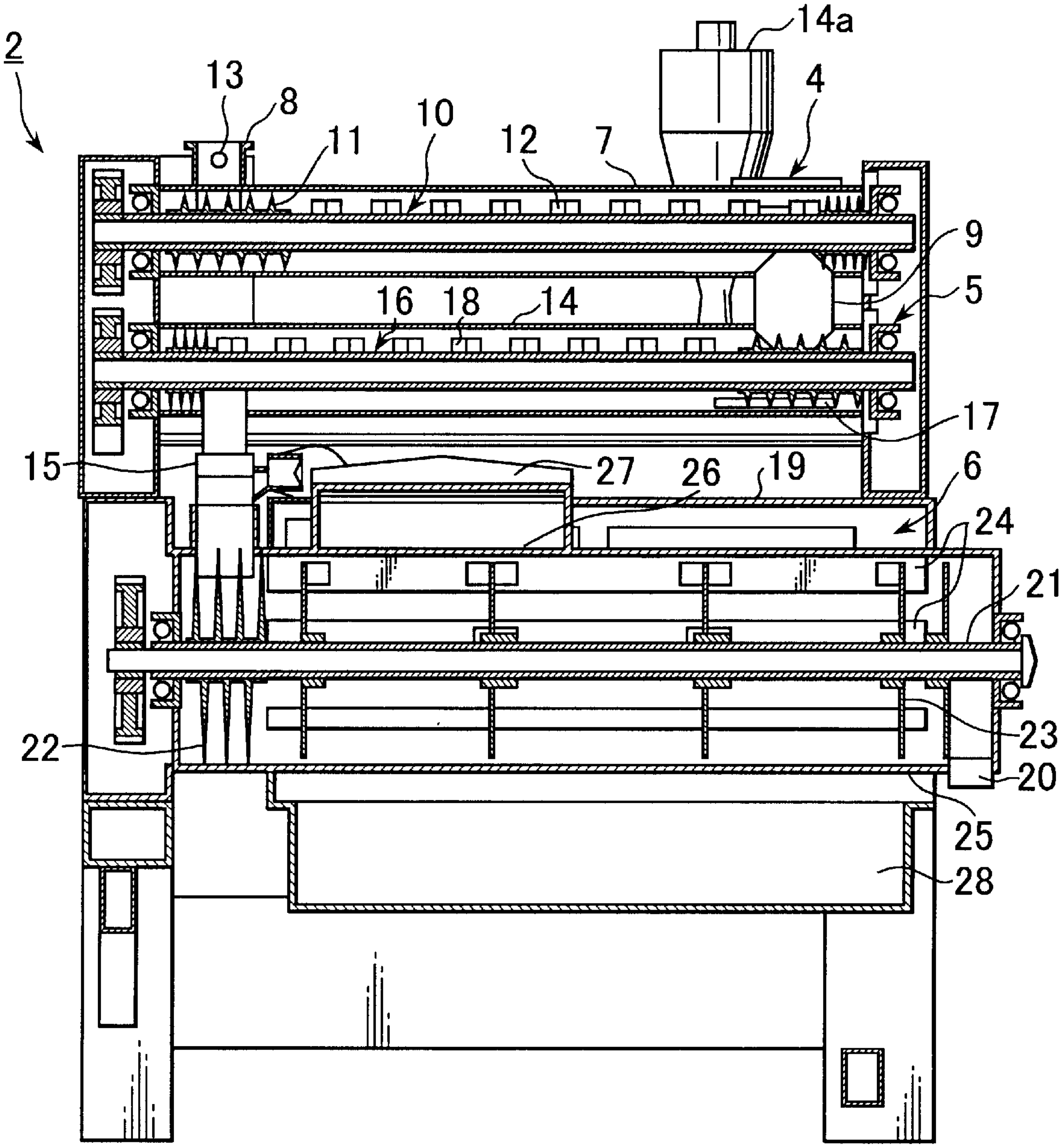
FIG. 2 is a vertical cross section of a polished rice processing section of the polished rice processing apparatus as shown in FIG. 1.

Arrangement of the polished rice processing section 2 including the wet processing device 4, the thermal adhesion device 5 and the separating/drying device 6 as a unit will be described in detail referring to FIG. 2.

The wet processing device 4 is arranged at the uppermost position in the polished rice processing section 2 and comprises a screw cylinder 7 arranged horizontally and a screw shaft 10 rotatably supported in the screw cylinder 7. A supply cylinder 8 for supplying the material polished rice into the screw cylinder 7 is arranged at the proximal end portion of an upper circumference of the screw cylinder 7, and an outlet cylinder 9 is arranged at the distal end portion of an lower circumference of the screw cylinder 7 to be connected to the thermal-adhesion material processing device 5.

The screw shaft 10 has a screw blade 11 at the proximal portion under the supply cylinder 8 and a plurality of stirring vanes 12 in the region between the screw blade 11 and the outlet cylinder 9. A spray nozzle 13 is arranged in the supply cylinder 8 to spray water to the material polished rice thrown into the supply cylinder 8. A pulley fixed to one end of the screw shaft 10 is connected with a motor (not shown) through a belt.

The thermal adhesive material processing device 5 is arranged under the wet processing device 4 and comprises a screw cylinder 14 arranged horizontally and a screw shaft 16 rotatably supported in the screw cylinder 14. The outlet cylinder 9 is connected to the proximal end portion of an upper circumference of the screw cylinder 14 and an outlet cylinder 15 is arranged at the distal end portion of a lower circumference of the screw cylinder 14 to be connected to the drying/separating 6. The screw shaft 16 has a screw blade 17 at the proximal portion under the outlet cylinder 9 and a plurality of stirring vanes 18 in a region between the screw blade 17 and the outlet cylinder 15.

A hopper 14*a* for supplying the granular material is arranged to be connected to the proximal end portion of the screw cylinder 14 and an adjustor for adjusting feeding rate of the granular material to be supplied is arranged between the hopper 14*a* and the screw cylinder 14. A pulley fixed to one end of the screw shaft 16 is connected with a motor (not shown) through a belt.

The separating/drying device 6 is arranged below the thermal-adhesion material processing device 5 and comprises a cylindrical casing 19, a screen cylinder 25 having a plurality of slits, and a rotary shaft 21 supported rotatably in the screen cylinder 25. The outlet cylinder 15 of the thermal-adhesion material processing device 5 is connected to a proximal end portion of the cylindrical casing 19 to communicate with the screen cylinder 25, and an outlet 20 for taking out the processed polished rice (no-bran rice) is arranged at the distal end of the cylindrical casing 19 to communicate with the screen cylinder 25. The rotary shaft 21 has a screw blade 22 at the proximal portion under the outlet cylinder 15 and a plurality of longitudinal stirring vanes 24 supported by radially extending arms 23 in a region between the screw blade 22 and the outlet 20. A pulley fixed to one end of the rotary shaft 21 is connected with a motor (not shown) through a belt.

The screen cylinder 25 is arranged to surround the longitudinal stirring vanes 24. A blowing duct 27 from a dry air blower (not shown) is connected to a blowing inlet 26 arranged at an upper portion of the screen cylinder 25. A blowing discharge duct 28 is connected to the cylindrical casing 19 at a bottom portion thereof.

Arrangement of the granular material reprocessing section 3 including the granular material regulating device 45, the drying device 46 and the conveying device 47 will be described in detail referring to FIGS. 3–7.

First, arrangement of the granular material regulating device 45 will be described referring to FIG. 3. A rotary shaft 29 is rotatably supported in an casing 37 and a pulley 32 fixed to one end of the rotary shaft 29 is connected with a drive motor (not shown) by a belt 31. A feed screw 30 for feeding the granular material (thermal-adhesion material) supplied from a supply tank 33 into a screen tube (sifting tube) 38, a removing roller 34 for stirring and/or abrading the fed granular material to remove the bran on the surfaces of the granular material, and a discharge screw for discharging the granular material from an outlet 35 are fixed to the rotary shaft 29 from one end to the other end in the above order.

Figure 4:
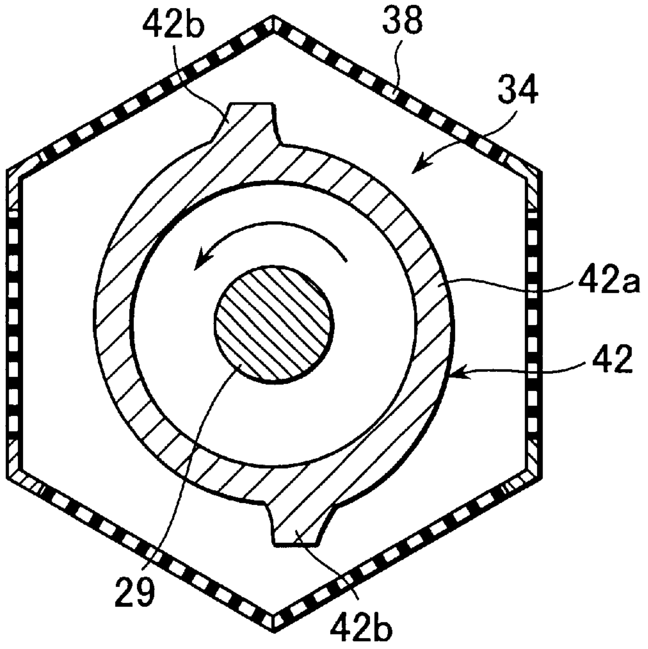
FIG. 4 is a vertical cross section of a removal roller and a screen tube on a plane perpendicular to an axis of the granular material regulating device as shown in FIG. 3.

A cross section of the removing roller 34 and the screen tube 38 on a plane perpendicular to an axis of the rotary shaft 29 is shown in FIG. 4. As shown in FIG. 4, the removing roller 34 comprises a stirring roll 42. The stirring roll 42 has a cylindrical body 42*a* and protrusions 42*b* longitudinally extending along an axis of the rotary shaft 29 for stirring the granular material on an outer circumference of the cylindrical body 42*a*. Thickness of the cylindrical body 42*a* in the cross section is gradually increased from one protrusion 42*b* to the other protrusion 42*b*. An air blow may be supplied from an inferior to an exterior of the cylindrical body 42*a* so as to facilitate separation of the bran from the granular material, if necessary. It is preferable that the screen tube 38 has a polygonal cross section. In the example shown in FIG. 4, the screen tube 38 has a hexagonal cross section.

Figure 5:
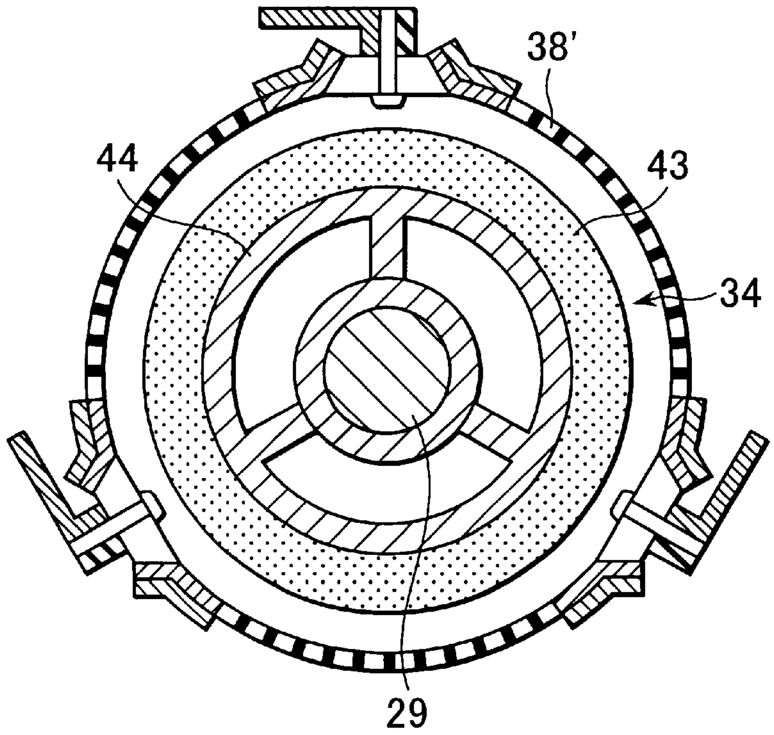
FIG. 5 is a vertical cross section of another embodiment of the removal roller comprising an abrading roll and a screen tube on a plane perpendicular to an axis of the granular material regulating device.

Alternatively, as shown in FIG. 5, the removing roller 34 may comprise a cylindrical abrading roll 43 containing abrasive grains such as carborundum (silicon carbide), emery, etc. The abrading roll 43 is supported by a retainer 44 fixed on the rotary shaft 29. In this case, the screen tube 38' has a circular cross section.

Figure 3:
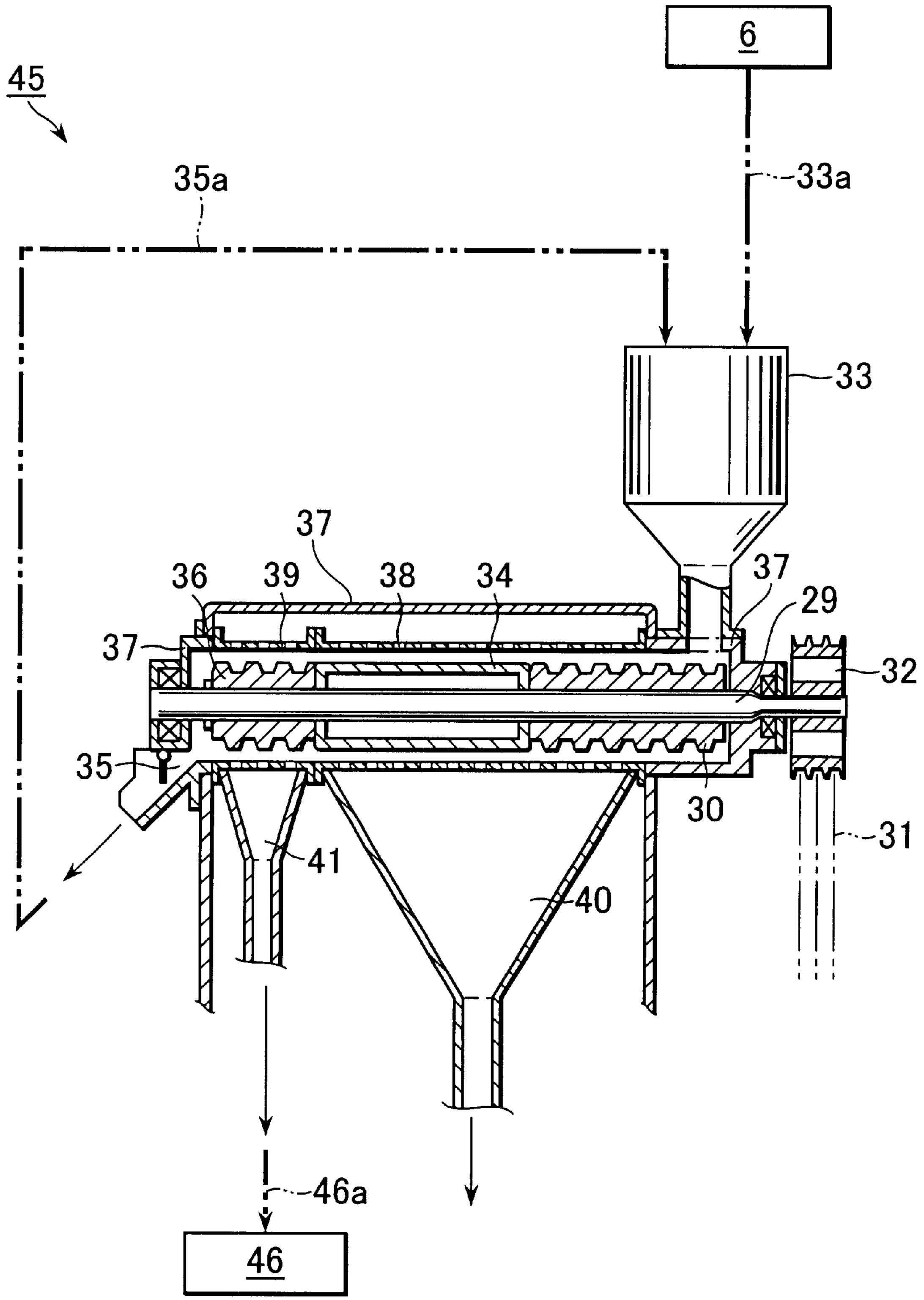
FIG. 3 is a vertical cross section of a granular material regulating device.

As shown in FIG. 3, the rotary shaft 29, the feed screw 30, the removing roller 34 and the discharge screw 36 are covered by the casing 37. A proximal end of the casing 37 is connected with the supply tank 33 at the upper position above the feed screw 30. The supply tank 33 is connected with the separating/drying device 6 of the polished rice processing section 2 through the conveyor 33*a*. It is preferable to provide a feed rate adjustor at the lower portion of the supply tank 33. The outlet 35 is located on the casing 37 at a position near the distal end of the discharge screw 36 and is connected to the supply tank 33 through a conveyer 35*a* for feeding back the granular material.

The screen tube 38 for separating the bran removed from the granular material and the granular material with bran removed is arranged between the removing roller 34 and the casing 37 with a predetermined clearance therebetween. The screen tube 38 has a number of through holes of predetermined first mesh size. The first mesh size is set so that the bran removed from surfaces of the granular material passes the screen tube 38 but the granular material with bran removed does not pass the screen tube 38. The screen tube 38 may be arranged to extend to cover a middle portion of the feed screw 30, as shown in FIG. 3. With the screen tube 38 extending to the middle portion of the feed screw 30, fine grinded particles, etc. mixed in the granular material can be discharged from the screen tube 38 before the granular material reaches the removing roller 34. Another screen tube (sifting tube) 39 is arranged around the discharge screw 36 with a predetermined clearance between the discharge screw 36 and the casing 37. The screen tube 39 has a number of through holes of predetermined second mesh size. The second mesh size is set so that the granular material with bran removed can pass. Outlet funnels 40 and 41 are arranged at lower positions of the screen tube 38 and the screen tube 39 for discharging the bran and the granular material passed through the screen tube 38 and the screen tube 39, respectively, outside the granular material regulating device 45.

Figure 6:
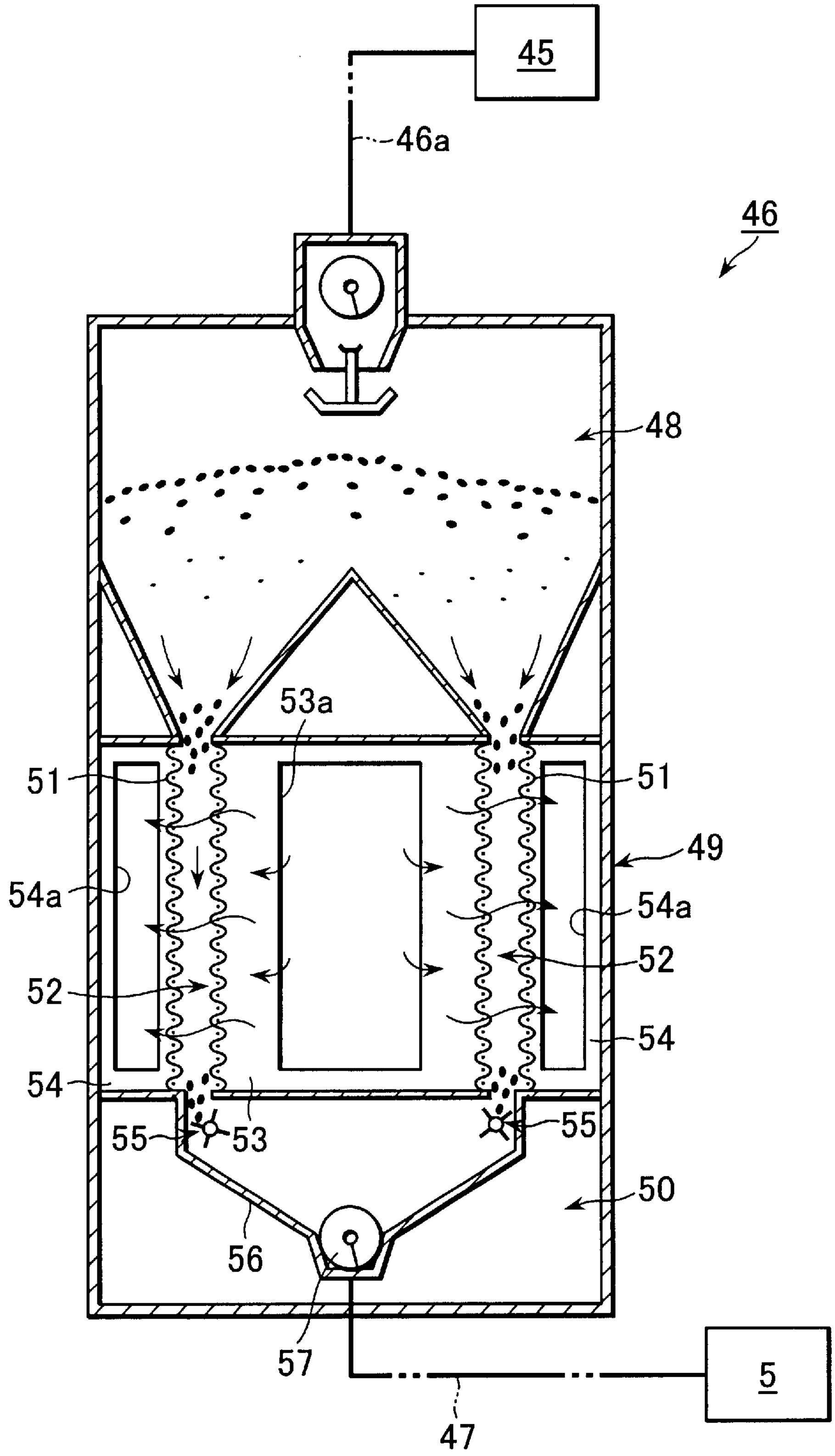
FIG. 6 is a vertical cross section of a drying device of the polished rice recycling section.

Details of the drying device 46 will be described. The drying device 46 has a structure, as shown in FIG. 6, including a storage tank 48 for storing the granular material, a hot air drying part 49 for drying the granular material with hot air, and a discharging part 50 for discharging the dried granular material outside the drying device 46, connected in series. The regulated granular material discharged from the outlet funnel 41 of the granular material regulating device 45 is supplied into the storage tank 48 through a conveyer 46*a*.

The hot air drying part 49 includes a pair of granular material flowing paths 52 having side walls formed by porous panels 51 facing each other to allow the granular material flows therethrough. A hot air inlet 53*a* for introducing hot air generated by a hot-air generating burner (not shown) into a hot-air supply chamber 53 is arranged on a side wall of a casing of the drying device 46 between the pair of granular material flow paths 52. Air discharge chambers 54 are arranged at outer sides of the granular material flowing paths 52 so as to discharge the hot air flown through the granular material flow paths 52 to outside of the drying device 46. Air outlets 54*a* are provided on the side wall of the casing to communicate with the air discharge chambers 54. The air inlets 53*a* are connected with an air discharge fan (not shown) to flow the hot air generated by the hot-air generating burner through the hot-air supply chamber 53, the granular material flowing paths 52 and the air discharge chamber 54 to outside of the drying device. Rotary valves 55 are provided at respective lower ends of the granular material flowing paths 52 to feed out the dried granular material by rotary action of the rotary valves 55 at predetermined intervals.

The discharge part 50 includes a slant portion 56 for correcting the granular material fed out by the rotary valves 55, a bottom screw 57 for discharging the granular material corrected by the slant portion 56 outside the drying device 46. The granular material discharged by the bottom screw 57 is fed back to the thermal-adhesion material processing device 5 through the conveying device 47 including a lifter. It is preferable that the granular material discharged from the drying device 46 contains moisture of approximately 5% in weight.

A granular material supplement device 65 as shown in FIG. 1 is connected to the storage tank 48 for supplement the regulated granular material with new granular material.

Figure 7:
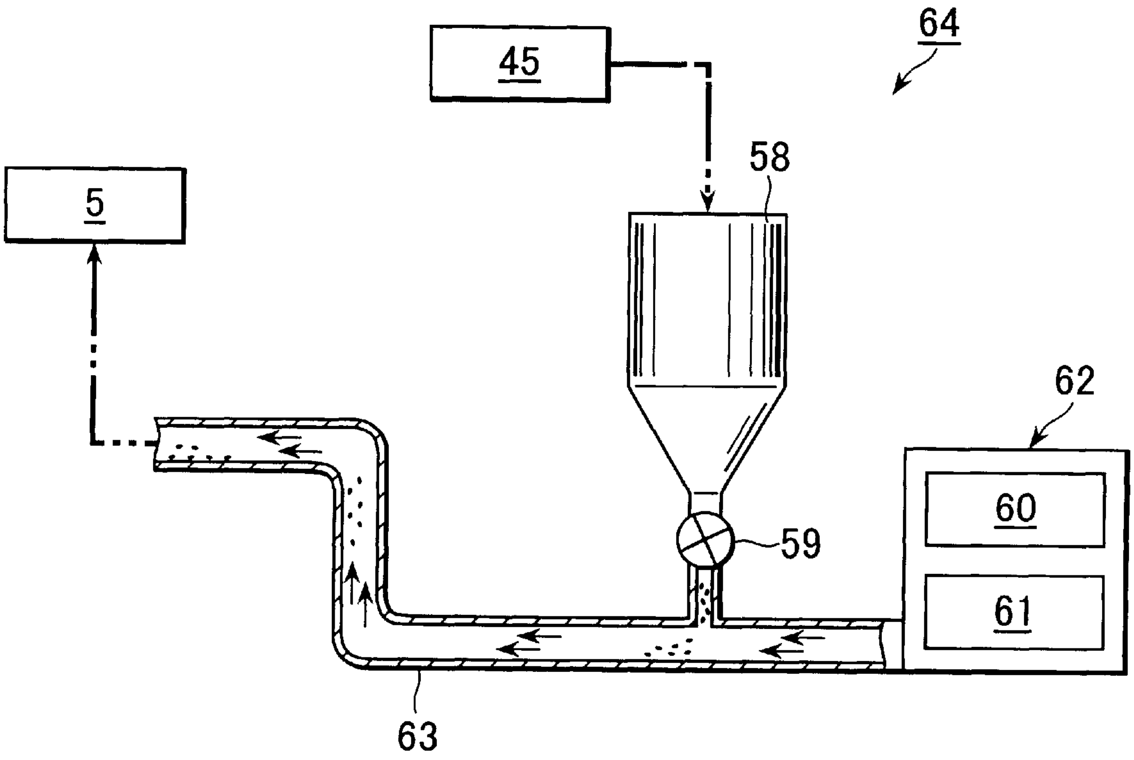
FIG. 7 is a side view of a hot air conveying device functioning as the drying device and also a conveying device.
Figure 8:
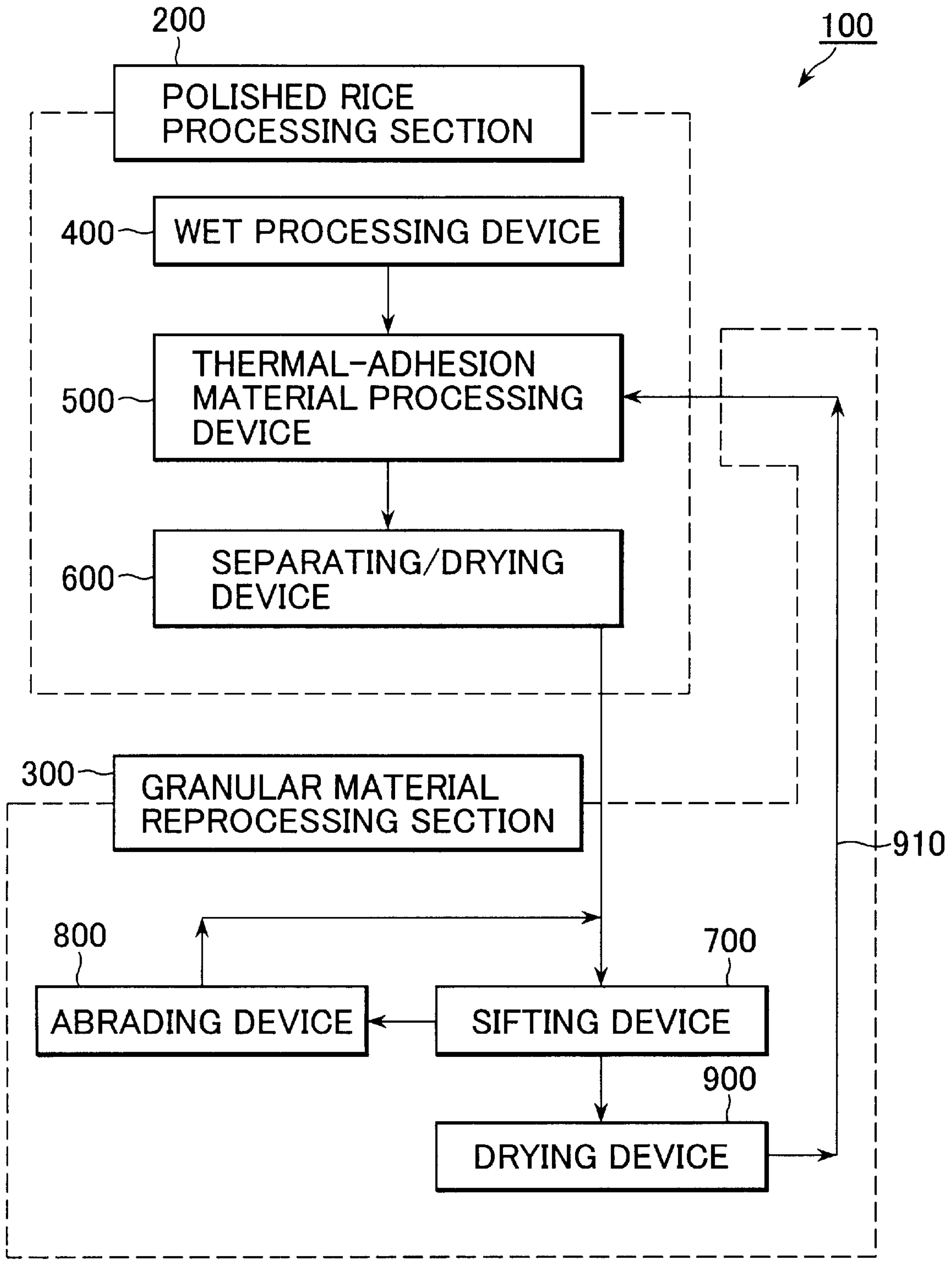
FIG. 8 is a schematic block diagram showing a whole arrangement of a conventional polished rice processing apparatus.

FIG. 7 shows a hot air conveying device 64 for conveying the processed granular material by means of hot air, having combined functions of the drying device for drying the regulated granular material, and the conveying device for conveying the reprocessed granular material to the thermal-adhesion material processing device. The hot air conveying device 64 comprises a hot air blower 62 having a hot air generating burner 60 and a blowing fan 61, a conveying pipe 63 having one end connected to the hot air blower 62 and the other end connected to the thermal adhesive material processing device 5, and a tank 58 for storing the granular material sent from the granular material regulating device 45. A rotary valve 59 is provided at the bottom of the tank 58 so as to adjust a feed rate of the granular material to be fed into the conveying pipe 63. The dried granular material is separated from the hot air, which has absorbed moisture of the granular material, by a cyclone or a bag filter in the vicinity of the thermal adhesive material processing device 5.

An operation of the polished rice processing apparatus 1 will be described in detail.

First, the polished rice processing section 2 will be explained. Material polished rice is supplied into the screw cylinder 11 from the supply cylinder 8 of the wet processing device 4. While supplying the material polished rice, moisture of approximately 5% of the material polished rice by weight is added to the material polished rice by the mist sprayed from the spray nozzle 13 arranged at the supply cylinder 8. The polished rice with moisture added is fed by rotation of the screw blade 11 and stirred by rotation of the stirring vanes 12 while being fed towards the distal end portion of the screw cylinder 7. In the stirring and feeding of the polished rice, bran remaining on grain surfaces of the polished rice absorbs the supplied moisture to be softened. A part of the bran is removed from the grain surfaces of the polished rice.

The polished rice with the softened bran and the bran removed from the polished rice are fed into the screw cylinder 14 of the thermal-adhesion material processing device 5 through the outlet cylinder 9 of the wet processing device 4. At the same time, the granular material stored in the hopper 14*a* is supplied into the screw cylinder 14 at the proximal portion thereof at a predetermined ratio of mixture (for example, 50% in weight). The granular material stored in the hopper 14*a* of the thermal-adhesion material processing device 5 has been dried and heated by the drying device 46 of the granular material reprocessing section 3 and has a temperature of 70° C.–100° C.

The granular material has high moisture-retaining, high moisture-absorbing and high adhesive characteristics. It is preferable to use edible granular material, such as pearl tapioca, obtained by processing starch, such as cassava, to be pre-gelatinized and dried to form into small balls having hardness of 2–5 kgf/cm$^2$ and predetermined uniform granularity. Further, grinded cereal such as grinded rice as edible material can be adopted as the granular material.

The granular material, the polished rice with the softened bran and the bran removed from the polished rice are stirred and mixed in the screw cylinder 14 by the stirring vanes 18 while being fed towards the distal end portion of the screw cylinder 14 by the screw blade 17.

The bran remaining on the grain surface of the polished rice is gelatinized immediately after touching with the heated granular material and is adhered to be captured by the granular material and removed from the grain surface of the polished rice with the aid of transfer of the moisture of the bran to the granular material. The bran already removed from the grain surfaces of the polished rice is also captured by the granular material.

The polished rice with bran removed and the granular material with bran captured are fed into the screen cylinder 25 of the separating/drying device 6 through the outlet cylinder 15 and are fed towards the distal end portion of the screen cylinder 19 by the screw blade 22 and stirred by the stirring vanes 24. At the same time, dry air is supplied from the air supply opening 26 to dry the polished rice and the granular material. The granular material with bran captured falls through meshes of the screen cylinder 25 to be separate from the polished rice with bran removed. The polished rice with bran removed (no-bran rice) is fed to the processed polished rice outlet 20 and discharged outside.

Function of the granular material reprocessing section 3 will be described referring to FIG. 3. The granular material separated from the processed polished rice by the separating/drying device 6 is supplied to the supply tank 33 of the granular material reprocessing device 45 by the conveyer 33*a*. The granular material supplied from the supply tank 33 is fed to a position of the screen tube 38 having the first mesh size by the rotation of the feed screw 30 and fine particles mixed in the granular material fall through meshes of the first mesh size of the screen tube 38 and removed. When the granular material reaches the removing roller 34, the granular material is stirred by the protrusions 42*b* of the stirring roll 42 which is rotating in the counterclockwise direction so that the bran captured on the grain surfaces of the granular material is separated and removed from the grain surfaces by friction acting between respective grains and pressing force against inner faces of the screen tube 38, in the case of removing roller 34 in the form of the stirring roll 42 and the screen tube 38 in the form of polygonal prism as shown in FIG. 4. With the rotation of the stirring roll 42 in the counterclockwise direction, pressure at a fixed position in a chamber between the screen tube 38 and the stirring roll 42 gradually increases by variation of thickness of the cylindrical body 42*a* and suddenly decreases immediately after the protrusion 42*b* passes. This variation of pressure provides sufficient stirring effects on the granular material in the chamber between the screen tube 38 and the stirring roll 42.

In the case of the removing roller 34 in the form of the abrading roll 43 and the screen tube 38' in the form of cylinder, as shown in FIG. 5, the bran adhered on the grain surfaces are separated and removed mainly by abrasion in contact with the abrading roll 43 rotating in the clockwise or the counterclockwise direction. In the above examples, the removing roller 34 is rotated at 300–800 r.p.m. with the rotary shaft 29 and the pressure of approximately 20 gf/cm$^2$ is applied to the granular material between the screen tube 38' and the removing roller 34.

The bran removed from the grain surfaces of the granular material falls through the meshes of the first mesh size of the screen tube 38' and corrected by the outlet funnel 40 to be discharged from the granular material reprocessing device 45 and packaged for specific use.

The granular material with bran removed is fed to a position of the discharge screw 36 and screened by the screen tube 39 having the second mesh size so that grains under the predetermined granularity fall through the screen tube 39 and corrected by the funnel 41. The granular material remaining in the second screen tube 39 is fed to the outlet 35 and fed back to the supply tank 33 by the conveyer 35*a* since removal of the bran on the surfaces of these grains by the separating roll 34 is insufficient.

The granular material corrected by the outlet funnel 41 is conveyed by the conveyer 46*a* to the storage tank 48 of the drying device 46 shown in FIG. 6. The granular material in the storage tank 48 gradually flow down to enter into the granular material flowing paths 52 by the periodical rotation of the rotary valves 55. The hot air of 100° C.–120° C. supplied to the hot air supplying chamber 53 flows through the grains of the granular material in the granular material flowing paths 52 and discharged out of the drying device 46 through the air discharge openings 54*a*. The granular material in the granular material flowing paths 52 flows down while receiving the hot air to be dried and enters into the slant portion 56 by the rotary valves 55, taking approximately ten minutes. The granular material collected by the slant portion 56 is fed out of the drying device 46 by the bottom screw 57 and conveyed by the conveying device 47 to the thermal-adhesion material processing device 5 at the temperature of approximately 100° C. It takes approximately one hour for the granular material to pass through the storage tank 48 and the hot air drying part 49. New granular material is fed into the storage tank 48 from the granular material supplement device 65 to be used in mixed with the reprocessed granular material.

In the case of adopting the hot air conveying device 64 as a combination of the drying device for drying the granular material and the conveying device for conveying the dried granular material, the hot air of 100° C.–120° C. is supplied to the conveying pipe 63 from the hot air blower 62 for blowing and conveying the granular material. The granular material fed into the conveying pipe 63 through the rotary valve 59 is blown and conveyed by the hot air to be dried while conveying in the conveying pipe 63. The granular material when fed to the thermal-adhesion material processing section 5 has a temperature of approximately 100° C. With this hot air conveying device 64, the drying device 46 as shown in FIG. 6 is made unnecessary and the polished rice processing apparatus 1 can be further reduced in size.

According to the above-described polished rice processing apparatus of the present invention, the bran captured on surfaces of the granular material is effectively removed and the granular material with the bran removed to have predetermined granularity suitable for recycling is obtained by screening by the granular material regulating device of the granular material reprocessing section, to make it unnecessary to provide an abrading device and a sifting device which have been conventionally required to arrange separately. Thus, the granular material reprocessing section is downsized to reduce the whole size of the polished rice processing apparatus.

What is claimed is:

1. A polished cereal processing apparatus comprising:

a polished cereal processing section for removing bran remaining on surfaces of polished cereal by mixing granular material with the polished cereal so that the remaining bran is captured by the granular material, and separating the polished cereal with bran removed and the granular material with bran captured; and a granular material reprocessing section for reprocessing the granular material with bran captured and feeding back the reprocessed granular material to said polished cereal processing section for recycling the granular material, said granular material reprocessing section including a screen tube for separating the granular material within a predetermined granularity range and a removing roller arranged to rotate in said screen tube for removing the bran captured on surfaces of the granular material fed into said screen tube.

2. A polished cereal processing apparatus according to claim 1, said polished cereal processing section comprising: a wet processing device for stirring the polished cereal while adding moisture thereto so as to soften the bran remaining on surfaces of the polished cereal; a thermal-adhesion material processing device for mixing and stirring the polished cereal processed by said wet processing device with preheated granular material so as to remove the softened bran on the surfaces of the polished cereal to be captured by the granular material; and a separating/drying device for drying the surfaces of the polished cereal processed by said thermal-adhesion material processing device and separating the polished cereal from the granular material, wherein the granular material reprocessed by said granular material reprocessing section is fed back to said thermal-adhesion material processing device.

3. A polished cereal processing apparatus according to claim 1, said granular material reprocessing section comprising: a granular material regulating device for regulating the granularity of the granular material by removing the bran captured on the surfaces of the granular material; a drying device for drying the granular material regulated by said granular material regulating device, and a conveying device for conveying the regulated granular material to said polished cereal processing section.

4. A polished cereal processing apparatus according to claim 3, said granular material regulating device comprising: an inlet for supplying the granular material into said screen tube; an outlet for discharging granular material which has not passes through meshes of said screen tube; and a rotary shaft arranged in said screen tube for supporting said removing roller at an upstream side near said inlet, and a discharge screw for feeding granular material remaining in said screen tube towards said outlet at a downstream side near the outlet, wherein meshes of said screen tube have a first mesh size to prevent the granular material of a predetermined granularity from passing through in a first region around said removing roller and a second mesh size to allow the granular material of the predetermined granularity to pass through in a second region around said discharge screw.

5. A polished cereal processing apparatus according to claim 4, said granular material regulating device further comprising a feed screw fixed on said rotary shaft in the vicinity of said inlet to feed the granular material into said screen tube, wherein said first region of meshes of said screen tube is extending to cover at least a part of said feed screw.

6. A polished cereal processing apparatus according to claim 4, wherein the granular material discharged from the outlet is fed back to said inlet.

7. A polished cereal processing apparatus according to claim 4, wherein said removing roller comprises a stirring roll having protrusions on an outer circumference thereof for stirring the granular material in said screen tube.

8. A polished cereal processing apparatus according to claim 7, wherein said screen tube has a polygonal cross section.

9. A polished cereal processing apparatus according to claim 4, wherein said removing roller comprises an abrading roll for abrading the granular material in said screen tube.

10. A polished cereal processing apparatus according to claim 9, wherein said screen tube has a circular cross section.

11. A polished cereal processing apparatus according to claim 3, wherein said drying device comprises a hot air generator and a blowing fan for supplying hot air blow, and said conveying device has a conveying pipe communicating with said drying device and said polished cereal processing section for conveying the granular material regulated by the granular material regulating device to said polished cereal processing section by the hot air blow supplied from said drying device.

* * * * *

UNITED STATES PATENT AND TRADEMARK OFFICE

CERTIFICATE OF CORRECTION

PATENT NO. : 6,457,404 B1
DATED : October 1, 2002
INVENTOR(S) : Takeshi Munesada et al.

It is certified that error appears in the above-identified patent and that said Letters Patent is hereby corrected as shown below:

Title page,
Item [73], Assignee, add -- Japan -- after "Tokyo"
Item [57], ABSTRACT,
Line 17, after "tube." insert -- The bran captured on surfaces of the granular material is effectively removed by the removing roller rotating in the screen tube and the granular material with bran removed to have granularity within a predetermined range is separated by the screen tube and fed back to the polished central processing section for recycling the granular cereal. --

Signed and Sealed this

Eighteenth Day of February, 2003

JAMES E. ROGAN
*Director of the United States Patent and Trademark Office*